United States Patent [19]

Cohen

[11] Patent Number: 4,994,331
[45] Date of Patent: Feb. 19, 1991

[54] FUEL CELL EVAPORATIVE COOLING USING FUEL AS A CARRIER GAS

[75] Inventor: Ronald Cohen, West Hartford, Conn.

[73] Assignee: International Fuel Cells Corporation, South Windsor, Conn.

[21] Appl. No.: 399,680

[22] Filed: Aug. 28, 1989

[51] Int. Cl.$^5$ .............................................. H01M 8/06
[52] U.S. Cl. ........................................ 429/17; 429/20; 429/26; 423/652
[58] Field of Search ............................ 429/17, 20, 26; 423/652

[56] References Cited

U.S. PATENT DOCUMENTS

| | | | |
|---|---|---|---|
| 3,982,962 | 9/1976 | Bloomfield | 429/20 X |
| 4,678,723 | 7/1987 | Wertheim | 429/17 |
| 4,781,241 | 11/1988 | Misage et al. | 429/26 X |
| 4,795,683 | 1/1989 | McElroy | 429/26 X |
| 4,824,740 | 4/1989 | Abrams et al. | 429/26 X |

Primary Examiner—Stephen J. Kalafut
Attorney, Agent, or Firm—Charles E. Sohl

[57] ABSTRACT

Removal of waste heat from a fuel cell is necessary for continuous operation. Evaporation, can be used to remove the heat produced by the exothermic reaction within the fuel cell. Water sprayed into a gaseous fuel stream is evaporated in an evaporative cooler adjacent to the fuel cell. The fuel/steam stream can then be utilized in the various other fuel cell system operations.

11 Claims, 2 Drawing Sheets

FUEL CELL EVAPORATIVE COOLING USING FUEL AS A CARRIER GAS

TECHNICAL FIELD

This invention relates to an improved fuel cell system, and especially to using evaporative cooling in combination with the fuel gas for temperature control.

BACKGROUND ART

Fuel cells in which fuel and oxidant react to produce electricity and water are well known in the art. Electricity is generally produced at a catalyst/electrolyte, which usually forms a common wall separating an anode chamber and a cathode chamber. A fuel, such as hydrogen, is introduced to the anode chamber, while an oxidant, such as oxygen or air, is introduced to the cathode chamber. In a Membrane Fuel Cell operating on hydrogen and oxygen, for example, the hydrogen is ionized at a catalyst, forming hydrogen ions and free electrons. The ions pass through the ion exchange membrane and react with oxygen to form water. In a Molten Carbonate Fuel Cell, on the other hand, oxygen reacts with carbon dioxide to form carbonate ions. The ions cross the ion exchange membrane where they react with hydrogen form water, carbon dioxide, and free electrons.

Although the exact reaction which produces electricity in the various fuel cells; Membrane Fuel Cell, Phosphoric Acid Fuel Cell, Molten Carbonate Fuel Cell, Solid Oxide Fuel Cell, or Alkaline Fuel Cell (hereafter referred to as fuel cell), may differ, all of the overall reactions are exothermic; producing waste heat.

In order to allow a fuel cell to operate continuously, the waste heat must be removed. Cooling, by altering the phase of a substance, typically water, from the liquid to the gaseous phase by addition of heat, can be employed to accomplish this task.

Various fuel cell cooling methods have been developed. U.S. Pat. No. 4,344,849 (incorporated herein by reference) discloses a technique which consists of passing water through separate coolant passages within the fuel cell. Some of the water is converted to steam; creating a two phase steam/liquid mixture. The steam and liquid are separated, the steam for use in the reformer and the water for recycle. U.S. Pat. No. 4,795,683 (incorporated herein by reference), discloses a technique of cooling a fuel cell by supplying a controlled amount of liquid water, as mist, to the anode, transporting the water through the ion exchange membrane to the cathode, and evaporating the water.

An object of the present invention is to provide a more efficient coolant process for use within a fuel cell system.

DISCLOSURE OF INVENTION

The present invention comprises a method of cooling a fuel cell using evaporative cooling. A gaseous fuel stream is sprayed with water, prior to entering an evaporative cooler; an area adjacent to the fuel cell where waste heat from the fuel cell causes the water particles carried in the fuel to evaporate. As the water evaporates it cools the fuel cell. The fuel stream, now a mixture of fuel, such as methane, and steam, can be utilized in the reformer where the fuel and steam react to form processed fuel, a mixture of raw fuel, steam, hydrogen, carbon dioxide, and carbon monoxide. Additional hydrogen, for use as fuel within the fuel cell, is formed in a low temperature shift reactor which reacts the carbon monoxide and steam.

The foregoing and other features and advantages of the present invention will become more apparent from the following description and accompanying drawings.

BEST MODE FOR CARRYING OUT THE INVENTION

As fuel cells generate electricity, they also generate heat. This waste heat must be removed for continuous operation. Various evaporative cooling methods have been employed in the prior art to accomplish this task. However, these methods limit the fuel cell system to certain configurations due, in most instances, to the need to separate the steam from the liquid water, to mix the steam and fuel streams, and to scrub the recycle water. This invention broadens the choices for configurations since it is not necessary to handle the steam/liquid mixture in a separate loop.

Figure 1:
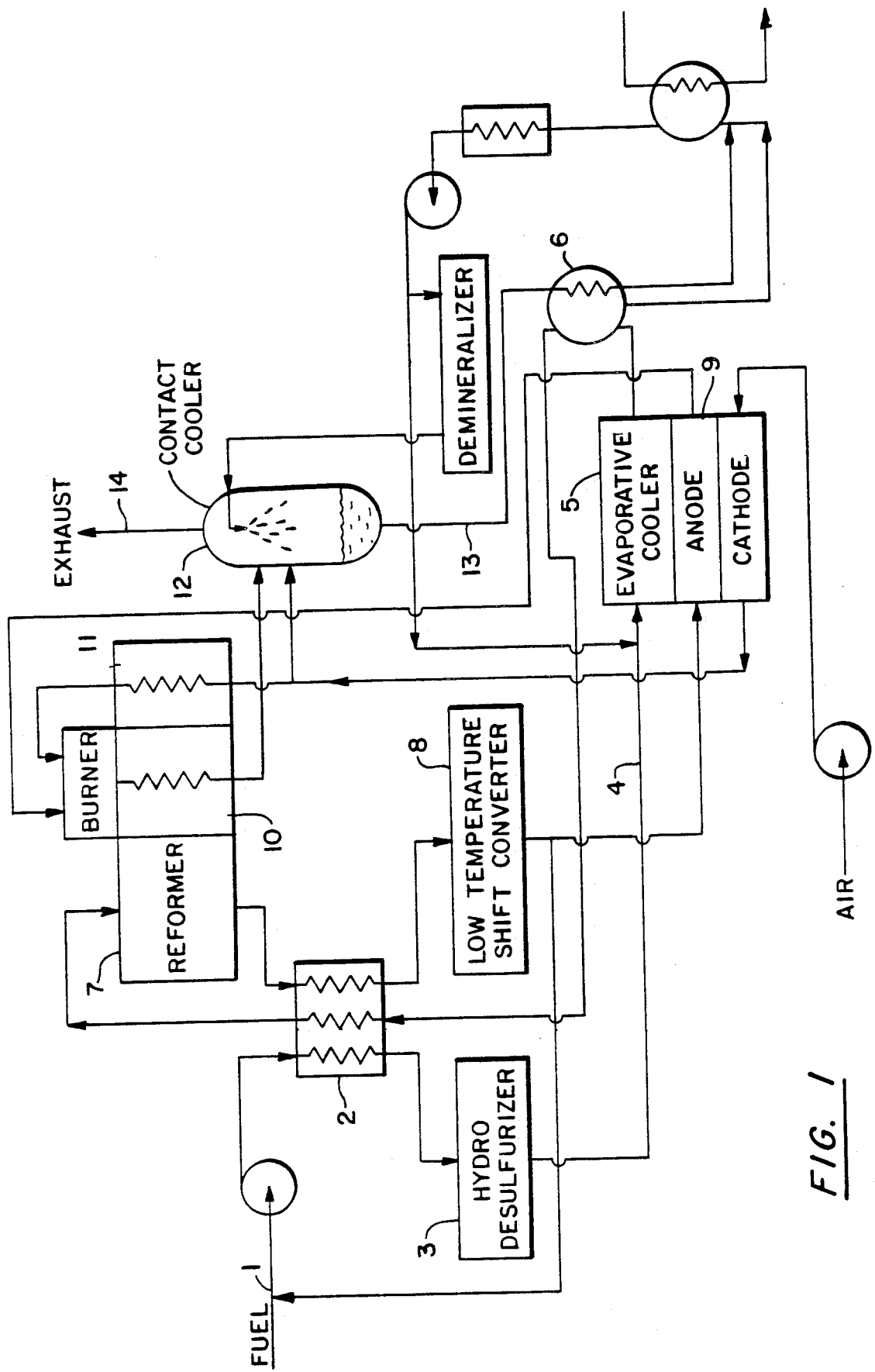
FIG. 1 is a schematic of a possible configuration utilizing the present invention.
Figure 2:
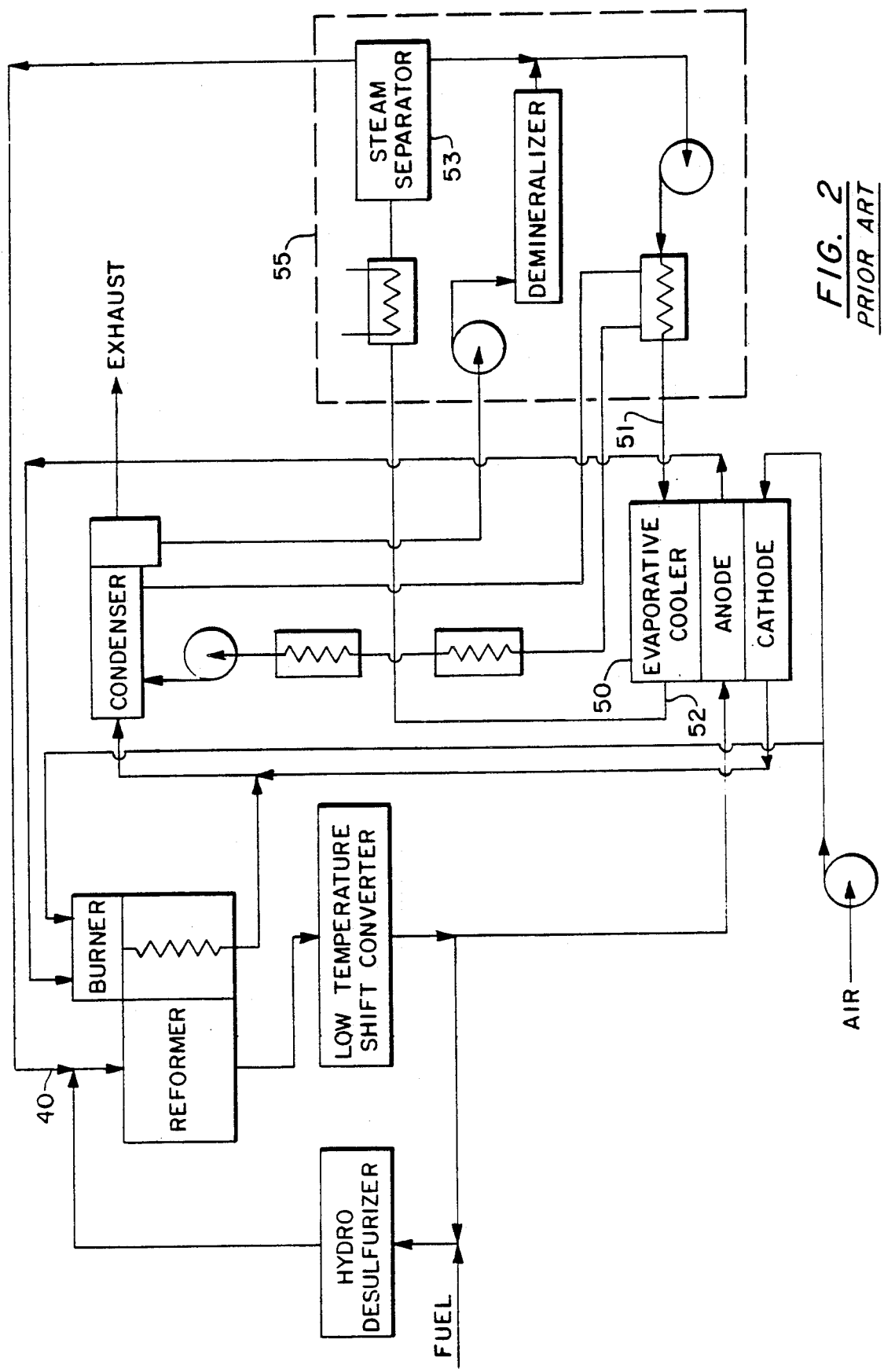
FIG. 2 is a schematic of one prior art scheme, including the water recycle.

Referring to FIG. 1, a possible configuration of the present invention, a fuel stream (1) containing raw fuel is preheated in heat exchanger (2) and desulfurized in the hydro desulfurizer (3). Water is sprayed directly into the fuel stream (4) immediately prior to entering the evaporative cooler (5). As the mist evaporates, the fuel cell is cooled and the fuel stream, which acts as a carrier gas for the mist, after the fuel/steam stream exits the evaporative cooler (5), the steam is partially condensed in the condenser (6), eliminating the need (7), or to utilize a steam/liquid separator (as in the prior art; FIG. 2, item 53). Then, in the reformer (7), a steam reformation reaction reacts the raw fuel and steam such that fuel (hydrogen) and carbon monoxide are among the products. The waste heat from the reformer (7) can be utilized in the heat exchanger (2) to attain the desired fuel/steam stream temperature prior to the reformer (7), and the necessary fuel stream entrance temperature in the hydro desulfurizer (3). After exiting the reformer (7), a shift reaction in the low temperature shift converter (8) reacts the steam and carbon monoxide to produce additional fuel (hydrogen) and carbon dioxide. The fuel is then used in the anode (9). Excess fuel and carbon monoxide are burned in the burner (10) with air which has been preheated in the heat exchanger (11).

The excess steam produced within the evaporative cooler (5) is removed in a condenser (6) to control $\Phi$, the fuel/steam ratio in a range from about 2.5 to about 5, and preferably at approximately 3.5. The condensate is later used in the contact cooler (12) in order to remove the remaining steam from the exhaust stream for recycling. The exhaust exits the system through line (14) while the condensate passes through line (13) to be used in the condenser (6). An additional benefit is that by removing the excess steam, the available heat is used more effectively in heating the fuel/steam stream for use within the reformer (7); heating excess steam would be an inefficient utilization of the available heat.

This technique can be employed with various types of fuel cells, such as Membrane Fuel Cells, Phosphoric Acid Fuel Cells, Alkaline Fuel Cells, Solid Oxide Fuel Cells, and Molten Carbonate Fuel Cells, and various types of fuels, such as methane, propane, naphtha, and natural gas, among others.

FIG. 2, a schematic of one prior art cooling scheme, shows a technique of using evaporative cooling to cool a fuel cell. In this schematic, however, liquid water is not sprayed into the fuel stream. Instead, liquid water is passed, in tubes, through the evaporative cooler (50), entering at (51) in the liquid phase and exiting at (52) as a two phase steam/liquid mixture. This mixture is separated in a steam separator (53); the steam is mixed with the fuel stream at point (40). The water, meanwhile, proceeds through a recycle loop. Problems inherent with this system include: impure water which causes debris to accumulate within the tubes and/or of other areas of the water recycle loop (55); the water recycle loop (55) requires more equipment than the present invention; the water recycle loop (55) is at a different pressure than the cell requiring the water tubes in the stack to be expensive material, such as stainless steel.

In the present invention the evaporator section in the stack contains fuel and water at the same pressure as the fuel and oxidant, therefore similar materials of construction can be used in the evaporative cooler as in the remainder of the cell parts. Furthermore, the system in the present invention is simpler than prior art because the water from the water recovery contact cooler (FIG. 1, item 12) is added directly to the fuel in the evaporative cooler (5). In prior art (FIG. 2) the water from the water recovery condenser must first be added to the water recycle loop (55). The system in the present invention is also better than other evaporative cooling approaches which evaporate the water into the cathode exhaust gas. U.S. pat. No. 4,678,723 discloses (incorporated herein by reference) sending the cathode exhaust, with the water vapor added, to the reformer. But the nitrogen in the air dilutes the hydrogen produced in the reformer causing a loss in performance of the cells. This must be compensated by turbocharging the system; complicating the system and adding cost.

Although this invention has been shown and described with respect to detailed embodiments thereof, it will be understood by those skilled in the art that various changes in form and detail thereof may be made without departing from the spirit and scope of the claimed invention.

I claim:

1. A method of cooling a fuel cell, said method using a fuel stream, water, a fuel cell, and an evaporative cooler, which comprises:
   a. spraying water into the fuel stream to form mist, wherein the fuel acts as a carrier gas;
   b. introducing the fuel/mist stream to the evaporative cooler;
   c. evaporating the water into the fuel stream using the evaporative cooler;
   d. locating said evaporative cooler adjacent to the fuel cell; whereby the exothermic reaction occurring within the fuel cell produces the heat which causes the water to evaporate; a phase change which absorbs the heat, cooling the fuel cell.

2. A method as in claim 1 wherein the fuel is selected from the group consisting of propane, methane, naphtha, natural gas, and mixtures thereof.

3. A method of producing hydrogen, said method using a fuel stream into which water has been evaporated in an evaporative cooler, and a reformer, which comprises:
   a. introducing the fuel stream to the reformer;
   b. reacting the water and the fuel to form hydrogen, carbon dioxide, and carbon monoxide.

4. A method as in claim 3 wherein the fuel is selected from the group consisting of propane, methane, naphtha, natural gas, and mixtures thereof.

5. A method of producing hydrogen, said method using a low temperature shift converter, and a fuel steam, said stream containing fuel, carbon monoxide, carbon dioxide, hydrogen, and water which has been evaporated into the stream, in an evaporative cooler which comprises:
   a. introducing the fuel/steam stream to the low temperature shift converter;
   b. reacting the steam and the carbon monoxide to produce carbon dioxide and hydrogen.

6. A method as in claim 5 wherein the fuel is selected from the group consisting of propane, methane, naphtha, natural gas, and mixtures thereof.

7. In a method of operating a fuel cell system, said system having a fuel stream, water, fuel, air, carbon monoxide, carbon dioxide, a hydro desulfurizer, a reformer, a low temperature shift converter, an evaporative cooler, means for heating, a contact cooler, a condenser, an exhaust, a fuel cell, said fuel cell having an anode chamber and a cathode chamber, which comprises:
   a. preheating stream;
   b. desulfurizing the fuel stream;
   c. spraying water into the fuel stream to form mist;
   d. evaporating the water into the fuel stream using an evaporative cooler, wherein the stream becomes a fuel/steam stream;
   e. using a condenser to condense excess steam out of the fuel/steam stream;
   f. pre-heating the fuel/steam stream;
   g. using a reformer to produce hydrogen, wherein the fuel/steam stream is introduced to the reformer where the fuel and steam react such that hydrogen, carbon monoxide, carbon dioxide are among the products;
   h. using a low temperature shift converter to react the steam and the carbon monoxide, wherein hydrogen and carbon dioxide are among the products;
   i. introducing the fuel stream to the anode chamber of the fuel cell as air is simultaneously introduced to the cathode chamber, wherein the reaction which occurs depletes the fuel/steam of hydrogen;
   j. burning the remaining hydrogen, carbon monoxide, and fuel out of the fuel/steam stream, wherein the fuel/steam stream becomes essentially steam and carbon dioxide.
   k. using a contact cooler to condense the steam out of the fuel/steam stream, wherein the water is recycled and the carbon dioxide is released through an exhaust.

8. A method as in claim 7 wherein the fuel is selected from the group consisting of methane, propane, naphtha, natural gas, and mixtures thereof.

9. A fuel cell system for generating electricity, which comprises:
   a. means for preheating a fuel stream containing a gaseous fuel prior to entering an evaporative cooler;
   b. means for removing sulfur from the fuel stream prior to the fuel stream entering said evaporative cooler;
   c. means for spraying water into the fuel stream prior to the fuel stream entering said evaporative cooler;

d. means for delivering the fuel/water stream to the evaporative cooler located adjacent to a fuel cell, wherein the evaporative cooler uses heat from the fuel cell to cause the water to evaporate into the fuel/water stream, forming steam;

e. means for removing excess steam from the fuel/steam stream after the fuel/steam stream exits the evaporative cooler;

f. means for heating the fuel/steam stream after the fuel/steam stream exits the evaporative cooler;

g. means for reforming the fuel/steam stream before the fuel/steam stream enters the fuel cell, wherein hydrogen and carbon monoxide are among the reaction products;

h. a shift converter for reacting steam and carbon monoxide to form hydrogen and other products before the fuel/steam stream enters the fuel cell;

i. a fuel cell stack including a plurality of fuel cells connected in series through a load, each cell comprising a cathode electrode, an anode electrode and electrolyte therebetween, a cathode chamber on the nonelectrolyte side of said cathode electrode and an anode chamber on the nonelectrolyte side of said anode electrode;

j. a burner where remaining fuel, hydrogen, and carbon monoxide from the fuel cell are burned with preheated air, wherein waste heat produced in the burner is used to preheat the air;

k. means for condensing any steam in the system to water; and l. an exhaust for venting by-product gases.

10. A fuel cell system as in claim 9 wherein the fuel is selected from the group consisting of methane, propane, naphtha, natural gas, and mixtures thereof.

11. A fuel cell system, which comprises:

a. a fuel cell stack including a plurality of fuel cells connected in series through a load, each cell comprising a cathode electrode, an anode electrode and electrolyte therebetween, a cathode chamber on the nonelectrolyte side of said cathode electrode and an anode chamber on the nonelectrolyte side of said anode electrode;

b. at least one evaporative cooler located adjacent to at least one fuel cell;

c. a means for spraying water into a fuel stream before said fuel stream enters said evaporative cooler;

d. a means for introducing the fuel/water stream to the evaporative cooler;

whereby an exothermic reaction occurring within the fuel cell produces heat which causes the water in the evaporative cooler to evaporate, cooling the fuel cell.

* * * * *

UNITED STATES PATENT AND TRADEMARK OFFICE
CERTIFICATE OF CORRECTION

PATENT NO.  : 4,994,331
DATED       : February 19, 1991
INVENTOR(S) : RONALD COHEN It is certified that error appears in the above-identified patent and that said Letters Patent is hereby corrected as shown below:

Col. 4, line 8:   "steam," should read --stream,--.

Col. 4, line 27:  "preheating stream" should read --preheating the fuel stream--.

Col. 4, line 47:  "steam of" should read --steam stream of--.

Signed and Sealed this

Twenty-third Day of June, 1992

Attest:

DOUGLAS B. COMER

*Attesting Officer*   *Acting Commissioner of Patents and Trademarks*